United States Patent
Kim et al.

(10) Patent No.: US 8,422,604 B2
(45) Date of Patent: Apr. 16, 2013

(54) METHOD FOR DETECTING FRAME SYNCHRONIZATION AND STRUCTURE IN DVB-S2 SYSTEM

(75) Inventors: Pan-Soo Kim, Daejon (KR); Dae-Ig Chang, Deajon (KR); Deock-Gil Oh, Daejon (KR); Seokheon Kang, Seoul (KR); Deokchang Kang, Seoul (KR); Wonjin Sung, Seoul (KR)

(73) Assignees: Electronics and Telecommunications Research Institute, Daejon (KR); Industry-University Cooperation Foundation Sogang University, Seoul (KR)

(*) Notice: Subject to any disclaimer, the term of this patent is extended or adjusted under 35 U.S.C. 154(b) by 984 days.

(21) Appl. No.: 12/518,103

(22) PCT Filed: Oct. 30, 2007

(86) PCT No.: PCT/KR2007/005395
§ 371 (c)(1),
(2), (4) Date: Jun. 6, 2009

(87) PCT Pub. No.: WO2008/069448
PCT Pub. Date: Jun. 12, 2008

(65) Prior Publication Data
US 2010/0322366 A1 Dec. 23, 2010

(30) Foreign Application Priority Data
Dec. 6, 2006 (KR) .......................... 10-2006-0123329

(51) Int. Cl.
*H03D 1/00* (2006.01)
(52) U.S. Cl.
USPC ............ 375/343; 370/514; 375/354; 375/365

(58) Field of Classification Search ................ None
See application file for complete search history.

(56) References Cited

U.S. PATENT DOCUMENTS

| 5,276,765 | A | * | 1/1994 | Freeman et al. | 704/233 |
| 5,329,558 | A | * | 7/1994 | Larsson et al. | 375/365 |
| 7,660,372 | B2 | * | 2/2010 | Lee et al. | 375/343 |
| 2005/0169400 | A1 | | 8/2005 | Chouly et al. | |

FOREIGN PATENT DOCUMENTS

| EP | 580287 | 1/1994 |
| KR | 2000-0023810 | 4/2000 |

OTHER PUBLICATIONS

Feng-Wen Sun et al., "Frame synchronization and pilot structure for second generation DVB via satellites", Int. J. Satell. Commun. Network, vol. 22, pp. 319-339, 2004.

* cited by examiner

*Primary Examiner* — David C. Payne
*Assistant Examiner* — Adolf Dsouza
(74) *Attorney, Agent, or Firm* — Rabin & Berdo, P.C.

(57) ABSTRACT

Provided is a method for detecting frame sync and frame structure in a satellite broadcasting system, which acquires an estimated value for detecting frame structure and frame sync and overcomes distortion of correlation analysis values by summing differential correlation values for SOF positions in consideration of the variable frame length, and selecting a maximum value in a channel environment with low signal-to-noise ratio and high frequency error. SOF is a sync word indicating the start point of a frame. The method includes the steps of: acquiring SOF differential correlation value sequences; acquiring sums ($d_{i,t}$) of the correlation values normalized for SOF positions based on the number of symbols per frame by using the above-generated SOF differential correlation value sequences; and selecting a maximum value ($d_{z,x}$) among the sums of correlation values, detecting z as a frame sync position, and detecting x as a frame structure index.

6 Claims, 4 Drawing Sheets

METHOD FOR DETECTING FRAME SYNCHRONIZATION AND STRUCTURE IN DVB-S2 SYSTEM

TECHNICAL FIELD

The present invention relates to a method for detecting frame sync and frame structure in a satellite broadcasting system; and, more particularly, to a frame sync and structure detecting method that can acquire an estimation value for detecting a transmission frame structure and overcome distortion of a correlation analysis value caused by frequency error by summing differential correlation values for positions of Start of Frame (SOF), which is a sync word indicating the start of a frame in consideration of the length of a variable frame, and selecting the maximum value in a channel environment of a satellite broadcasting system.

This work was supported by the IT R&D program of MIC/IITA [2005-S-013-02, "Development of Broadband Adaptive Satellite Communications and Broadcasting Convergence Technology"].

BACKGROUND ART

Specific embodiments of the present invention will be described by taking a Digital Video Broadcasting-Satellite 2 (DVB-S2) as an example of a satellite broadcasting system. As the boundary between broadcasting and communication becomes obscure and bi-directional services are available recently, it is required to develop broadband services and reliable transmission services. Thus, satellite broadcasting systems which require high transmission capacity with given bandwidths and signal power adopt adaptive modulation and coding methods.

Particularly, the European standard for digital video satellite broadcasting, i.e., DVB-S2, utilizes adaptive modulation and coding methods which select optimal modulation scheme and coding rate adaptive to channel conditions. The use of the adaptive modulation and coding methods allows receivers of a satellite communication system to control links adaptively to propagation conditions and thereby acquire transmission capacity up to about 100 to 200%.

However, each receiver of the satellite communication system adopting the transmission method essentially requires a frame structure detection process for identifying a varied transmission frame and a frame sync position detection process for detecting the start point of a frame.

Generally, the performance in the frame sync detection process and the frame structure detection process that are carried right after symbol synchronization in the initial synchronization mode are significant parameters that become basic assumption for acquiring performance required in the entire system.

One of the methods for detecting frame sync is to estimate the start point of a frame by deciding reliability of correlation analysis values after correlation analysis. According to the method, correlation values are all stored in a method applicable to the decision of reliability of correlation analysis and the maximum value among them is used. F. W. Sun, Y. Jiang and L. N. Lee disclose a method for detecting a frame based on a maximum value in an article entitled "Frame Synchronization and Pilot Structure for Second Generation DVB via Satellites," *International Journal of Satellite Communications and Networking*, Vol. 22, pp. 319-339, 2004.

According to the article, frame sync is detected based on a maximum value of correlation analysis values within a predetermined section of a DVB-S2 frame structure, and the frame structure and frame sync position are detected through Reed Muller (64.7) decoding of physical layer signaling code (PLSC) bits.

However, the conventional frame detection method requires an additional process for correcting frequency and phase errors in the PLSC decoding. In addition, a process of detecting accurate position information of a frame should precede the PLSC decoding. Therefore, there is a limit in applying the conventional frame detection method to an environment with frequency errors.

Another frame detection method for transmission frames having variable frame length is disclosed in Korean Patent Application No. 10-1999-7000294 by NTT Docomo, entitled "Transmission Method, Device and Receipt Device of Variable Length Frame."

According to the frame detection method of the technology disclosed in the above patent application, frames with variable length should be segmented based on predetermined segmentation rules to be transmitted in the form of multiple coded streams and added with a sync flag. Then, frame structure and frame sync position of transmitted frames are detected based on flags upon reception. Therefore, the technology cannot be applied to frames with fixed sync words, such as frames of a DVB-S2 system.

DISCLOSURE

Technical Problem

An embodiment of the present invention devised to deviate the above problems is directed to providing a frame sync and structure detecting method which acquires an estimated value for identifying frame structure and start point of frame. It overcomes distortion of correlation analysis values caused by frequency errors by summing differential correlation values for positions of Start of Frame (SOF) in consideration of the variable frame length, and selecting a maximum value in a channel environment of a satellite broadcasting system where signal-to-noise ratio is low and frequency error is high. Herein, the SOF is a sync word indicating the start point of a frame.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for detecting frame sync and frame structure in a satellite communication system, which includes the steps of: acquiring Start of Frame (SOF) differential correlation value sequences for reception symbols; acquiring sums ($d_{i,t}$) of the correlation values normalized for SOF positions based on the number of symbols per frame by using the above-generated SOF differential correlation value sequences; and selecting a maximum value ($d_{z,x}$) among the sums of correlation values, detecting z as a frame sync position of a transmitted frame, and detecting x as a frame structure index of the frame.

Also, the method of the present invention detects frame sync and structure of received frames by using a Start of Frame (SOF), which is a sync word indicating the start of a frame, when frequency is not synchronized due to signal distortion caused by low signal-to-noise ratio and high frequency errors. Therefore, it can detect frame sync and structure of transmission frames with high reliability in receivers of a satellite communication system.

Advantageous Effects

The frame sync and structure detecting method of the present invention can acquire an estimated value for detecting a transmission frame structure and a frame sync position and overcomes distortion of correlation analysis values caused by frequency errors by summing differential correlation values for positions of Start of Frame (SOF) in consideration of the variable frame length, and selecting a maximum value in a channel environment of a satellite broadcasting system where signal-to-noise ratio is low and frequency error is high. Herein, the SOF is a sync word indicating the start point of a frame.

BEST MODE FOR THE INVENTION

The advantages, features and aspects of the invention will become apparent from the following description of the embodiments with reference to the accompanying drawings, which is set forth hereinafter. When it is considered detailed description on a related art may obscure the point of the present invention, the description will not be provided. Hereinafter, specific embodiments of the present invention will be described in detail with reference to the accompanying drawings.

Figure 1:
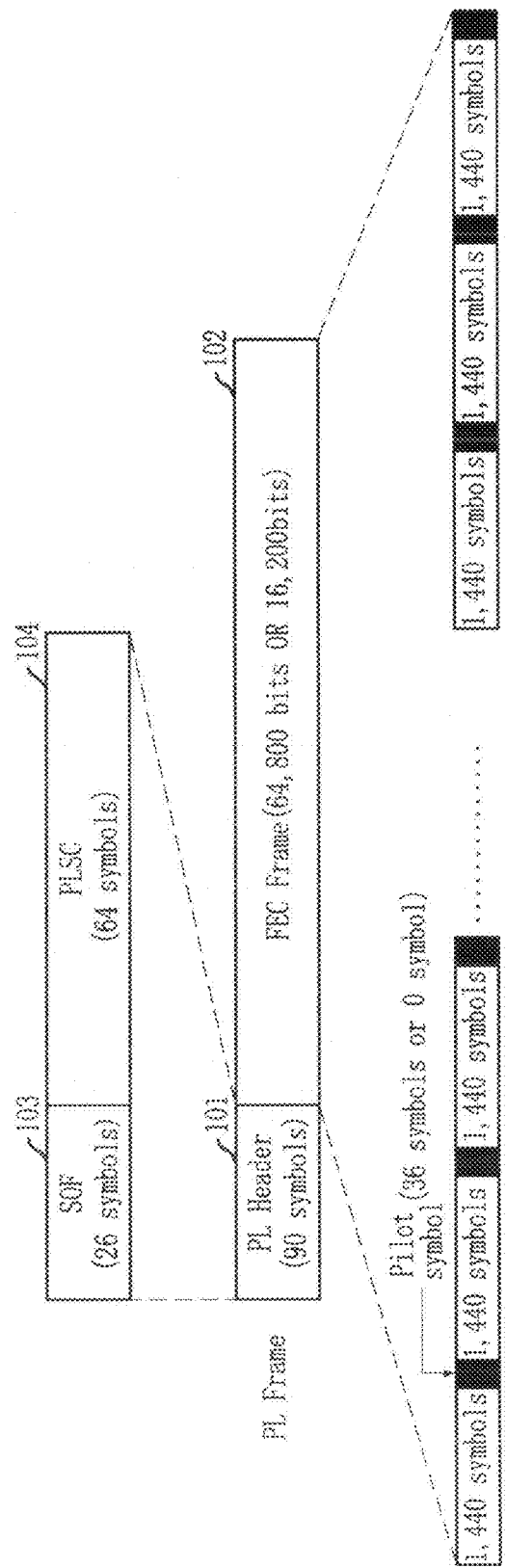
FIG. 1 illustrates a transmission frame of a Digital Video Broadcasting-Satellite 2 (DVB-S2) system in accordance with an embodiment of the present invention.

FIG. 1 illustrates a transmission frame of a Digital Video Broadcasting-Satellite 2 (DVB-S2) system in accordance with an embodiment of the present invention. Referring to FIG. 1, the transmission frame of the DVB-S2 system, to which the present invention is applied, includes a Start of Frame (SOF) 103 having 26 symbols, a physical layer (PL) header 101 including a physical layer signaling code (PLSC) 104 having 64 symbols, and a forward error correction (FEC) frame 102 having a pilot symbol and data symbols. Herein, the SOF 103 is a sync word indicating the start of a frame.

The frame length and structure of transmission frames vary according to adaptive modulation and coding methods of a DVB-S2 system. The varying structures of transmission frames are presented in the following table 1.

TABLE 1

| Frame Structure Index (t) | Modulation Scheme | bits/frame | Presence of Pilot (number of pilot symbols) | Total number of FEC symbols (Number of total frame symbols ($l_t$)) |
|---|---|---|---|---|
| 0 | QPSK | 64800 | Present (36 × 22 = 792) | 33192 (33282) |
| 1 | QPSK | 64800 | Not present (0) | 32400 (32490) |
| 2 | QPSK | 16200 | Present (36 × 5 = 180) | 8280 (8370) |
| 3 | QPSK | 16200 | Not present (0) | 8100 (8190) |
| 4 | 8PSK | 64800 | Present (36 × 14 = 504) | 22104 (22194) |
| 5 | 8PSK | 64800 | Not present (0) | 21600 (21690) |
| 6 | 8PSK | 16200 | Present (36 × 3 = 108) | 5508 (5598) |
| 7 | 8PSK | 16200 | Not present (0) | 5400 (5490) |
| 8 | 16APSK | 64800 | Present (36 × 11 = 396) | 16596 (16686) |
| 9 | 16APSK | 64800 | Not present (0) | 16200 (16290) |
| 10 | 16APSK | 16200 | Present (36 × 2 = 72) | 4122 (4212) |
| 11 | 16APSK | 16200 | Not present (0) | 4050 (4140) |
| 12 | 32APSK | 64800 | Present (36 × 8 = 288) | 13248 (13338) |
| 13 | 32APSK | 64800 | Not present (0) | 12960 (13050) |
| 14 | 32APSK | 16200 | Present (36 × 2 = 72) | 3312 (1402) |
| 15 | 32APSK | 16200 | Not present (0) | 3240 (3330) |
| 16 | Dummy | x | x | 3240 (3330) |

*QPSK: Quadrature Phase Shift Keying
8PSK: 8-Phase Shift Keying
16APSK: 16 Amplitude Phase Shift Keying
32APSK: 32 Amplitude Phase Shift Keying The Table 1 shows 16 variable frame structures varying according to a modulation scheme (e.g., QPSK, 8PSK, 16APSK, and 32APSK), data length (e.g., 64800 and 16200 bits/frame), and the presence of pilot symbols. A dummy frame is also included as one of variable frame lengths. Thus, there are a total of 16 frame lengths and 17 frame structures.

Herein, t denotes the index of a transmission frame structure, and the number of symbols for each frame ($l_t$, t=0~16) is variable according to the frame structure index. Also, position information of known symbol sequences such as SOF and pilot is variable according to the number of symbols for each transmission frame.

Figure 2:
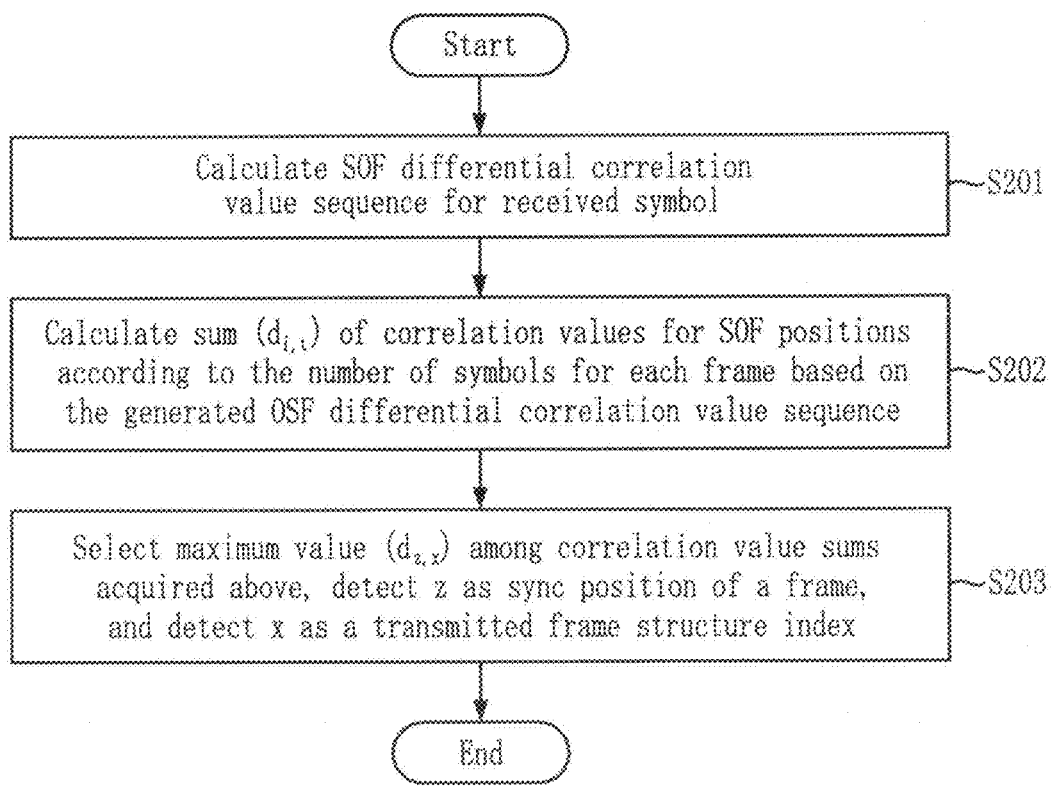
FIG. 2 is a flowchart describing a method for detecting frame sync and frame structure in a satellite communication system in accordance with an embodiment of the present invention.

FIG. 2 is a flowchart describing a method for detecting frame sync and frame structure in a satellite communication system in accordance with an embodiment of the present invention. The drawing illustrates a process of detecting the 16 frame lengths and acquiring frame sync.

First, in step S201, SOF differential correlation value sequences for reception symbols are calculated based on the following Equation 1. Herein, since even a structure having the maximum number of frame symbols among the 16 combinations should be taken into consideration as for the length of the correlation value sequence (a structure whose frame structure index is 0 in the Table 1), 33282 symbols for each of $N_F$ frames, which comes to a total of 33282×$N_F$ differential correlation values, are calculated.

$$c(n) = \sum_{m=n}^{24+n} q_m^* h_{m-n} \quad \text{Eq. 1}$$

where $c(n)$ denotes a differential correlation value of an $n^{th}$ SOF ($n=0 \sim 33282 \times N_F - 1$); when an $m^{th}$ reception symbol is $r_m$, $q_m$ denotes differential information between adjacent reception symbols which is $q_m = r_m r^*_{m+1}$; and when a transmitted reference signal of an $m^{th}$ SOF is $s_m$, $h_m$ denotes differential information between adjacent transmission reference symbols which is $h_m = s_m s^*_{m-1}$.

The Equation 1 is normalized into the following Equation 2.

$$p(n) = \sum_{m=n}^{24+n} |q_m|^2 \quad \text{Eq. 2}$$

where $p(n)$ denotes an $n^{th}$ power normalization coefficient.

Subsequently, in step S202, sums $d_{i,t}$ ($i=0 \sim 33281$) of correlation values normalized with respect to $N_F$ SOF positions are calculated and stored for each structure ($t=0 \sim 15$) based on the above-generated SOF correlation sequences, the number ($l_t$) of symbols (which means the distance between SOFs for each structure) for each frame with respect to the 16 frame structures (t), and the following Equation 3.

Figure 3:
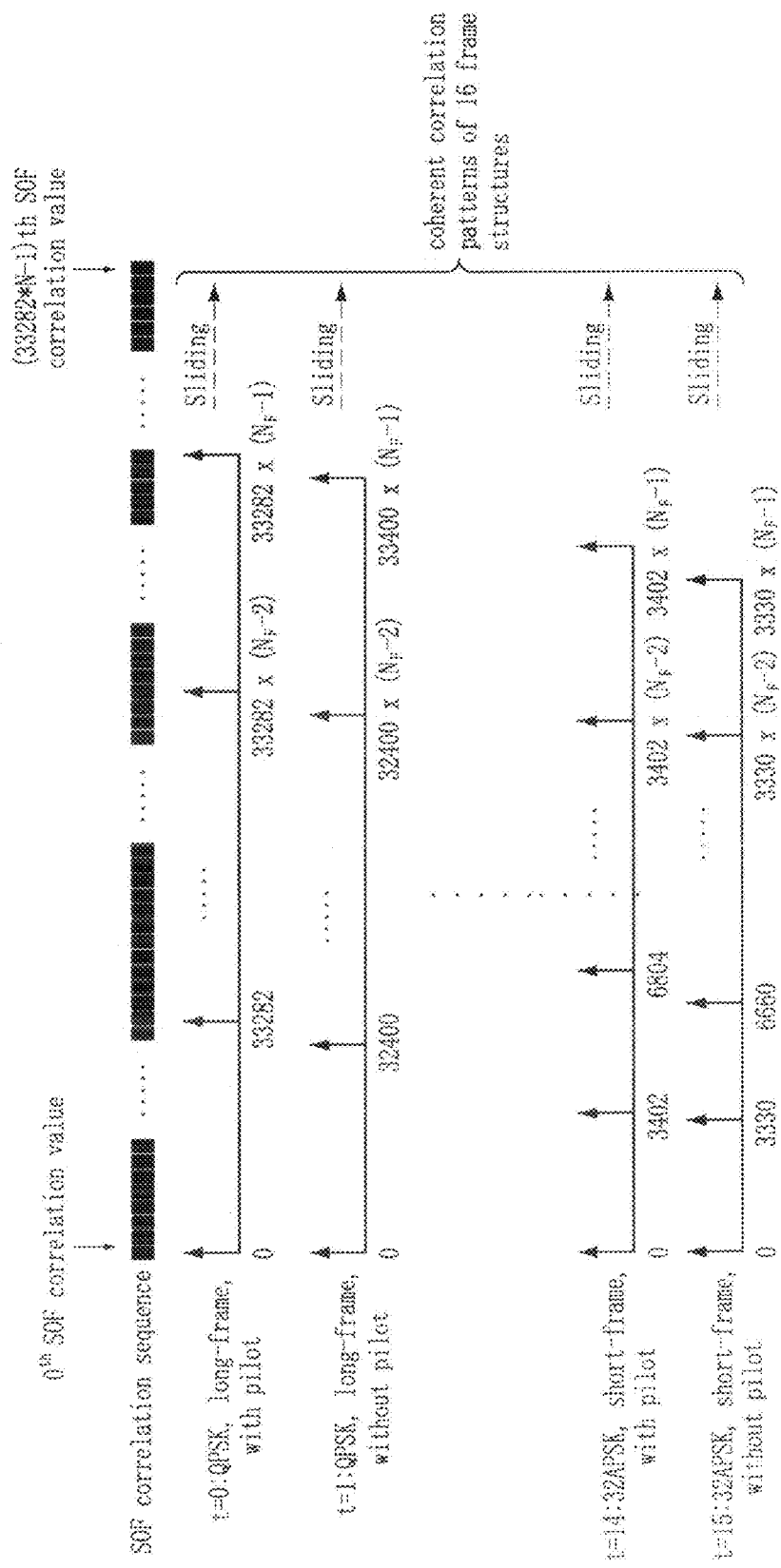
FIG. 3 illustrates a process of summing normalized correlation values for SOF positions in accordance with an embodiment of the present invention.

Referring to FIG. 3, the process will be described more in detail.

Referring to FIG. 3, the calculation of the Equation 3 takes detection of frame sync (i) and a frame structure (t) all into consideration, and the calculation is carried out by increasing i, that is, by moving the $N_F$ correlation values by one symbol at a time to detect frame sync at different SOF positions, which are marked as an arrow in the drawing, for each structure.

$$d_{i,t} = \frac{\left|\sum_{k=0}^{N_F} c(l_t \times k + i)\right|^2}{25 \times N_F \times \sum_{k=0}^{N_F} p(l_t \times k + i)} \quad \text{Eq. 3}$$

where $N_F$ denotes the number of frames; i (i=0, 1, ..., 33281) denotes a symbol index related to frame sync detection; t (t=0, 1, ..., 15) denotes an index indicating a frame length among the 16 frame lengths; and $l_t$ denotes a frame length when a frame of a frame structure t is transmitted.

In step S203, when the maximum value among the calculated $d_{i,t}$ values is $d_{z,x}$, z is detected as a frame sync position of a transmitted frame, and x is detected as a frame structure index of the frame.

Meanwhile, the dummy frame has the same symbol length per frame as frames of 32APSK, 16200-bit frame, and a frame without a pilot (which corresponds to a frame structure index 15). When index is counted on the basis of 3330-symbol length, the frame is identified at the real part of a demodulator based on automatic gain control (AGC) and a shape of constellation formed after completion of frequency sync and phase sync after frame sync is acquired and a temporary frame structure is detected.

Figure 4:
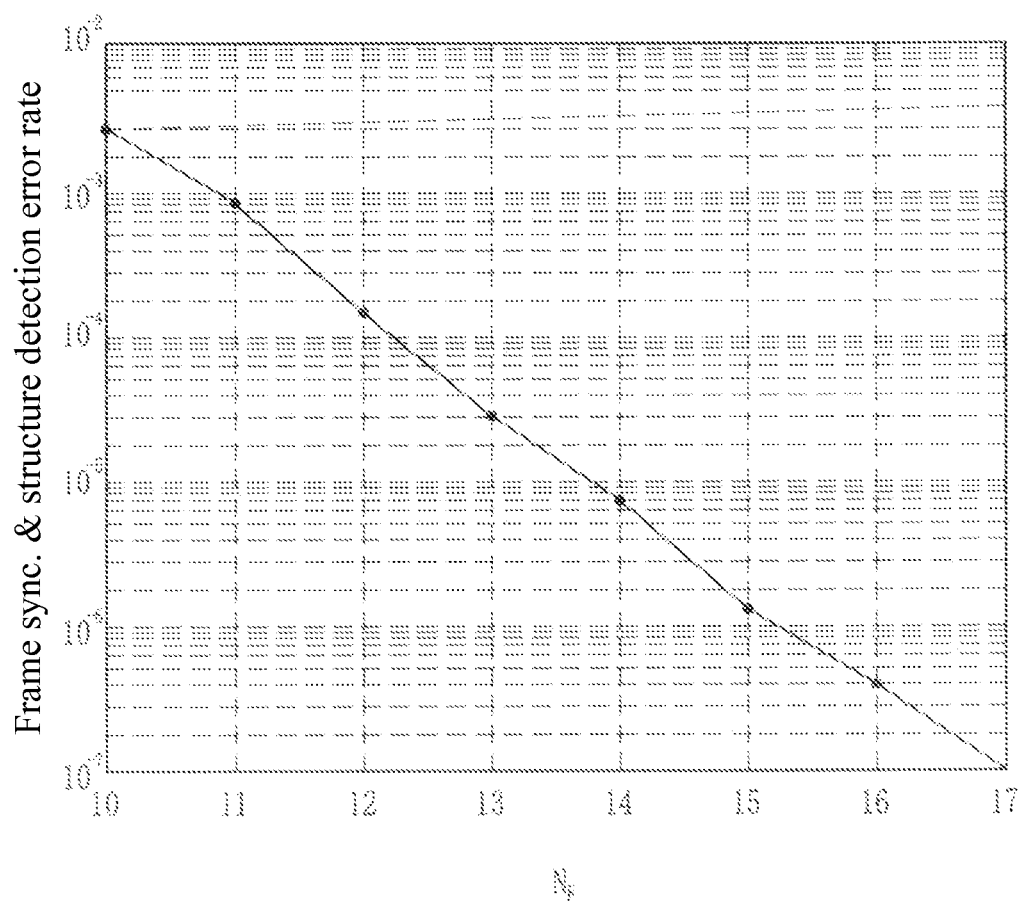
FIG. 4 shows performance of a frame sync and structure detecting method in a satellite broadcasting system in accordance with an embodiment of the present invention.

FIG. 4 shows performance of a frame sync and structure detecting method in a satellite broadcasting system in accordance with an embodiment of the present invention. Herein, a case where a frame is identified not to have the transmitted frame structure but to be one of the other 15 frame structures or a case where detection of a frame sync position of a transmitted frame fails is defined as an error in the detection of frame sync and transmission frame structure. The drawing shows a simulation result of a detection error rate in the detection of frame sync and transmission frame structure according to variation of the number $N_F$ of used frames.

First, the simulation adopts an Additive White Gaussian Noise (AWGN) channel whose signal-to-noise ratio is as low as -2.35 dB (ES/NO=-2.35 dB). Also, the simulation assumes a transmission bandwidth of 25 MHz, uniform distribution of frequency error in a section of [-5 MHz, 5 MHz], and the maximum frequency error of 20% of bandwidth.

As illustrated in FIG. 4, when 17 frames ($N_F=17$) are used for the detection of frame sync and a frame structure of a transmission frame, it is possible to acquire performance of less than about $10^7$ based on the frame sync and frame structure detection error rate. When the number of frames is increased, additional gain in performance is expected.

The method of the present invention can be realized as a program and stored in a computer-readable recording medium, such as CD-ROM, RAM, ROM, floppy disks, hard disks, magneto-optical disks and the like. Since the process can be easily implemented by those skilled in the art to which the present invention pertains, further description will not be provided herein.

The present application contains subject matter related to Korean Patent Application No. 10-2006-0123329, filed in the Korean Intellectual Property Office on Dec. 6, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for detecting frame sync and a frame structure, among a number N of frame structures, in a satellite communication system, each frame structure corresponding to a frame of a number of symbols, a maximum number of symbols per frame among all of the frame structures being M, the method comprising:

acquiring Start of Frame (SOF) differential correlation value sequences for a plurality of symbols received by the satellite communication system;

acquiring sums ($d_{i,t}$) of correlation values, normalized for SOF positions based on the number of symbols per frame, using the SOF differential correlation value sequences for each pair (i, t), t corresponding to one of the plurality of frame structures, $0 \leq t \leq (N-1)$, i corresponding to one of the symbols, $0 \leq i \leq (M-1)$; and selecting a maximum value ($d_{z,x}$) among the sums of correlation values, detecting z as a frame sync position of a transmitted frame, and detecting x as a frame structure index of the transmitted frame.

2. The method of claim 1, wherein the frame has a variable frame structure varying according to a modulation scheme, a data length, and presence of pilot symbols.

3. The method of claim 2, wherein the satellite broadcasting system is a Digital Video Broadcasting-version 2 (DVB-S2) system.

4. A method for detecting frame sync and a frame structure in a satellite communication system, comprising:

acquiring Start of Frame (SOF) differential correlation value sequences for reception symbols;

acquiring sums ($d_{i,t}$) of correlation values normalized for SOF positions based on a number of symbols per frame by using the SOF differential correlation value sequences; and selecting a maximum value ($d_{z,x}$) among the sums of correlation values, detecting z as a frame sync position of a transmitted frame, and detecting x as a frame structure index of the transmitted frame, wherein in the step of acquiring Start of Frame (SOF) differential correlation value sequences, the SOF differential correlation value sequences are calculated based on an equation expressed as:

$$c(n) = \sum_{m=n}^{24+n} q_m^* h_{m-n}$$

where
c(n) denotes a differential correlation value of an $n^{th}$ SOF (n=0~33282×$N_F$−1);

when an $m^{th}$ reception symbol is $r_m$, $q_m$ denotes differential information between adjacent reception symbols which is $q_m = r_m r^*_{m+1}$; and when a transmitted reference signal of an $m^{th}$ SOF is $s_m$, $h_m$ denotes differential information between adjacent transmission reference symbols which is $h_m = s_m s^*_{m+1}$.

5. A method for detecting frame sync and a frame structure in a satellite communication system, comprising the steps of:

acquiring Start of Frame (SOF) differential correlation value sequences for reception symbols;

acquiring sums ($d_{i,t}$) of correlation values normalized for SOF positions based on a number of symbols per frame by using the SOF differential correlation value sequences; and selecting a maximum value ($d_{z,x}$) among the sums of correlation values, detecting z as a frame sync position of a transmitted frame, and detecting x as a frame structure index of the transmitted frame, wherein in the step of acquiring sums ($d_{i,t}$) of the correlation values normalized for SOF positions based on the number of symbols per frame, the sums ($d_{i,t}$) of the correlation values normalized for SOF positions are calculated based on an equation expressed as:

$$d_{i,t} = \frac{\left| \sum_{k=0}^{N_F} c(l_t \times k + i) \right|^2}{25 \times N_F \times \sum_{k=0}^{N_F} p(l_t \times k + i)}$$

where
$N_F$ denotes a number of frames;
i (i=0, 1, . . . , 33281) denotes a symbol index related to frame sync detection;
t (t=0, 1, . . . , 15) denotes an index indicating a frame length among 16 frame lengths; and
$l_t$ denotes a frame length when a frame of a frame structure t is transmitted.

6. The method of claim 5, wherein in the step of acquiring sums ($d_{i,t}$) of the correlation values normalized for SOF positions based on the number of symbols per frame, the sums ($d_{i,t}$) of the correlation values normalized for SOF positions are calculated by moving $N_F$ correlation values at different SOF positions by a frame symbol position at a time, that is, by increasing i, for each frame structure in consideration of frame sync (i) and frame structure (t) in order to detect the frame sync.

* * * * *